(12) United States Patent
Lee et al.

(10) Patent No.: US 10,091,753 B2
(45) Date of Patent: Oct. 2, 2018

(54) METHOD OF TRANSMITTING SIGNAL BY ADAPTIVELY CONTROLLING WINDOWING OR FILTERING IN WIRELESS COMMUNICATION SYSTEM AND APPARATUS THEREFOR

(71) Applicant: LG ELECTRONICS INC., Seoul (KR)

(72) Inventors: Sangrim Lee, Seoul (KR); Kwangseok Noh, Seoul (KR); Dongkyu Kim, Seoul (KR); Hojae Lee, Seoul (KR); Myeongjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 15/417,022

(22) Filed: Jan. 26, 2017

(65) Prior Publication Data

US 2018/0213501 A1 Jul. 26, 2018

(51) Int. Cl.
*H04W 56/00* (2009.01)
*H04L 12/26* (2006.01)
*H04W 74/08* (2009.01)
*H04L 27/26* (2006.01)
*H04W 28/02* (2009.01)

(52) U.S. Cl.
CPC ...... *H04W 56/0045* (2013.01); *H04L 27/2646* (2013.01); *H04L 43/0864* (2013.01); *H04W 28/0215* (2013.01); *H04W 74/0833* (2013.01)

(58) Field of Classification Search
CPC ......... H04W 56/0045; H04W 28/0215; H04W 74/0833; H04L 27/2646; H04L 43/0864
See application file for complete search history.

(56) References Cited

U.S. PATENT DOCUMENTS

| | | | | |
|---|---|---|---|---|
| 2012/0115539 | A1* | 5/2012 | Zhang | H04W 56/0045 455/524 |
| 2016/0165631 | A1* | 6/2016 | Gao | H04L 5/001 370/336 |
| 2017/0359790 | A1* | 12/2017 | Wang | H04W 28/04 |
| 2018/0007673 | A1* | 1/2018 | Fwu | H04W 4/70 |

* cited by examiner

*Primary Examiner* — Duc C Ho
(74) *Attorney, Agent, or Firm* — Dentons US LLP

(57) ABSTRACT

A method of transmitting a signal by adaptively controlling windowing or filtering by a user equipment in a wireless communication system, includes the steps of receiving a message including a timing advance (TA) value from a base station, determining a windowing type or a filtering type corresponding to the TA value, and transmitting an uplink signal to which the determined windowing type is applied. In this case, the windowing type is distinguished according to a length of a valid symbol and the filtering type can be distinguished according to a filter coefficient value.

18 Claims, 6 Drawing Sheets

FIG. 4
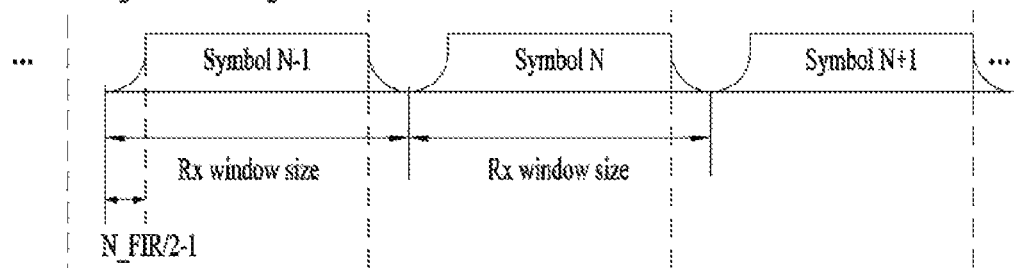
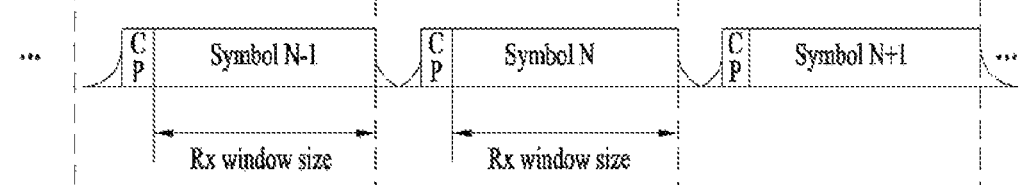
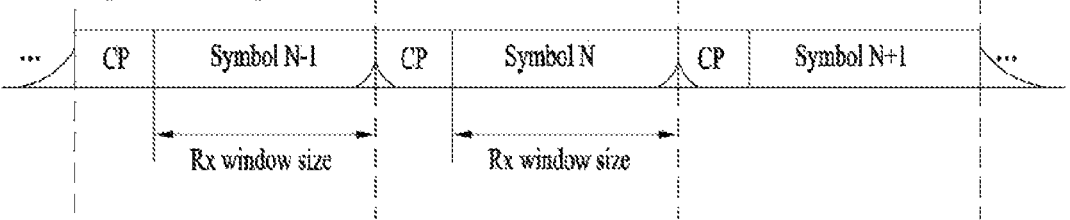
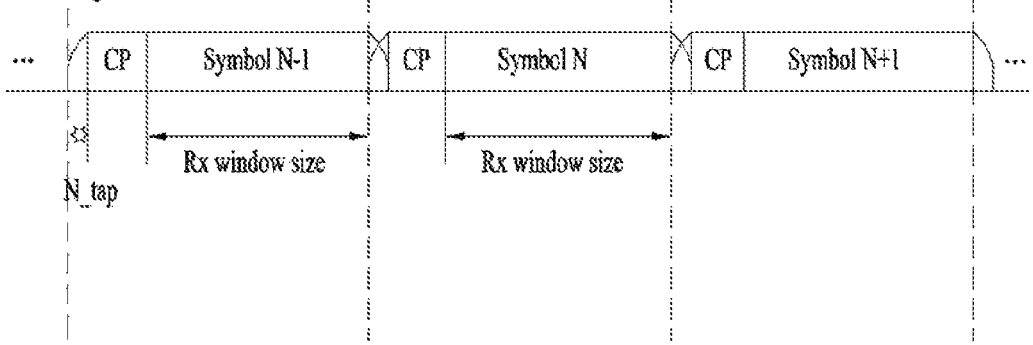

METHOD OF TRANSMITTING SIGNAL BY ADAPTIVELY CONTROLLING WINDOWING OR FILTERING IN WIRELESS COMMUNICATION SYSTEM AND APPARATUS THEREFOR

BACKGROUND OF THE INVENTION

Field of the Invention

The present invention relates to a wireless communication, and more particularly, to a method of transmitting a signal by adaptively controlling windowing or filtering and an apparatus therefor.

Discussion of the Related Art

As more communication devices require greater communication capacity, necessity for mobile broadband communication, which is enhanced compared to a legacy radio access technology (RAT), is emerging. And, a massive MTC (machine type communication) for providing various services at anytime and anywhere by connecting a plurality of devices and objects with each other also corresponds to one of main issues to be considered in a next generation communication.

Moreover, discussion on a communication system to be designed in consideration of a service/UE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

SUMMARY OF THE INVENTION

Accordingly, the present invention is directed to an apparatus and method thereof that substantially obviate one or more problems due to limitations and disadvantages of the related art.

A technical task of the present invention is to provide a method for a user equipment to transmit a signal by adaptively controlling windowing or filtering in a wireless communication system.

Another technical task of the present invention is to provide a user equipment for adaptively controlling windowing or filtering in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting a signal by adaptively controlling windowing or filtering by a user equipment in a wireless communication system, includes the steps of receiving a message including a TA (timing advance) value from a base station, determining a windowing type or a filtering type corresponding to the TA value, and transmitting an uplink signal to which the determined windowing type is applied. In this case, the windowing type is distinguished according to a length of a valid symbol and the filtering type can be distinguished according to a filter coefficient value.

The TA value and the windowing type corresponding to the TA value can be predefined.

The method can further include the step of receiving information on the TA value and the windowing type corresponding to the TA value from the base station.

If there is no downlink data to be received in a specific subframe and there is uplink data to be transmitted in the specific subframe, the determining step can include the step of determining a windowing type corresponding to a predefined smallest TA value irrespective of the received TA value. The transmitting step can include the step of transmitting the uplink signal to which the windowing type corresponding to the predefined smallest TA value is applied in the specific subframe.

If the sum of an RF switching time value of the user equipment, the TA value, and ½ RTT value is greater than a GP (guard period) value, the determining step can include the step of determining a windowing type corresponding to a predefined largest TA value irrespective of the received TA value. The transmitting step can include the step of transmitting the uplink signal to which the windowing type corresponding to the predefined largest TA value is applied.

The method can further include the step of transmitting a random access preamble to the base station. In this case, it is able to receive the message in response to the random access preamble.

The transmitting step can include the step of transmitting an uplink signal to which a taper length corresponding to the determined windowing type is applied.

To further achieve these objects and other advantages and in accordance with the purpose of the invention, as embodied and broadly described herein, according to a different embodiment, a user equipment for adaptively controlling windowing or filtering in a wireless communication system includes a receiver configured to receive a message including a TA (timing advance) value from a base station, a processor configured to determine a windowing type or a filtering type corresponding to the TA value, and a transmitter configured to transmit an uplink signal to which the determined windowing type is applied. In this case, the windowing type is distinguished according to a length of a valid symbol and the filtering type can be distinguished according to a filter coefficient value.

The TA value and the windowing type corresponding to the TA value can be predefined.

The method can further include the step of receiving information on the TA value and the windowing type corresponding to the TA value from the base station.

If there is no downlink data to be received in a specific subframe and there is uplink data to be transmitted in the specific subframe, the processor can be configured to determine a windowing type corresponding to a predefined smallest TA value irrespective of the received TA value.

The transmitter can be configured to transmit the uplink signal to which the windowing type corresponding to the predefined smallest TA value is applied in the specific subframe.

If the sum of an RF switching time value of the user equipment, the TA value, and ½ RTT value is greater than a GP (guard period) value, the processor can be configured to determine a windowing type corresponding to a predefined largest TA value irrespective of the received TA value.

The transmitter can be configured to transmit the uplink signal to which the windowing type corresponding to the predefined largest TA value is applied.

The transmitter is configured to transmit a random access preamble to the base station and the receiver can be configured to receive the message in response to the random access preamble.

The transmitter can be configured to transmit an uplink signal to which a taper length corresponding to the determined windowing type is applied.

According to one embodiment of the present invention, it is able to widen a data transmission bandwidth or enhance capability in an asynchronous reception situation by improving spectral containment characteristic in frequency domain through filtering or windowing in a new waveform.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram for a conceptual symbol shape of waveforms in time domain;

DETAILED DESCRIPTION OF THE INVENTION

Figure 1:
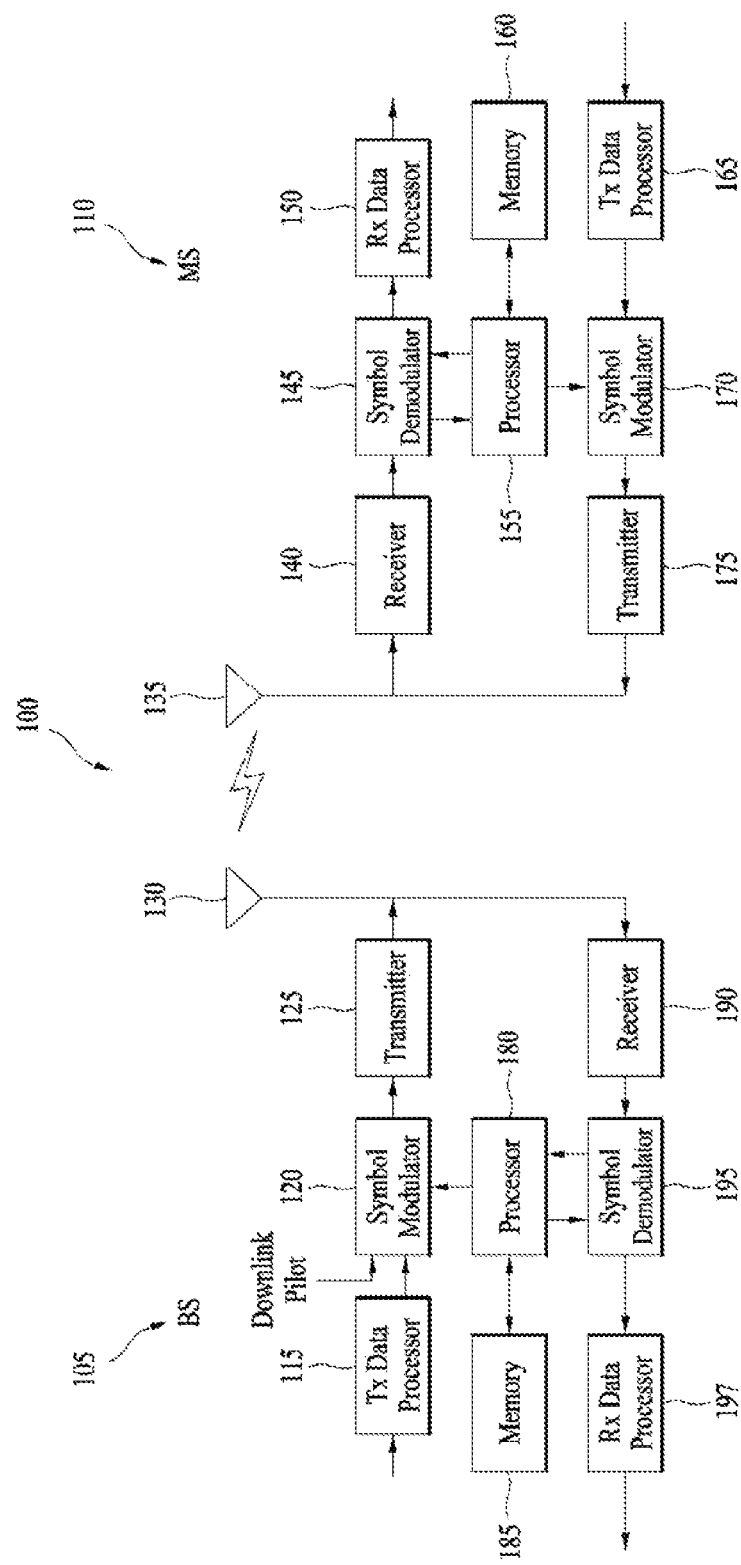
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system, 3GPP LTE-A, or 5G system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

In a 5$^{th}$ generation (5G) New RAT, in order to minimize latency, it may consider a TDM structure of a control channel and a data channel as one type of frame structures.

The present invention proposes new and various frame structures for a 5$^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, massive connectivity (e.g., IoT).

Figure 2:
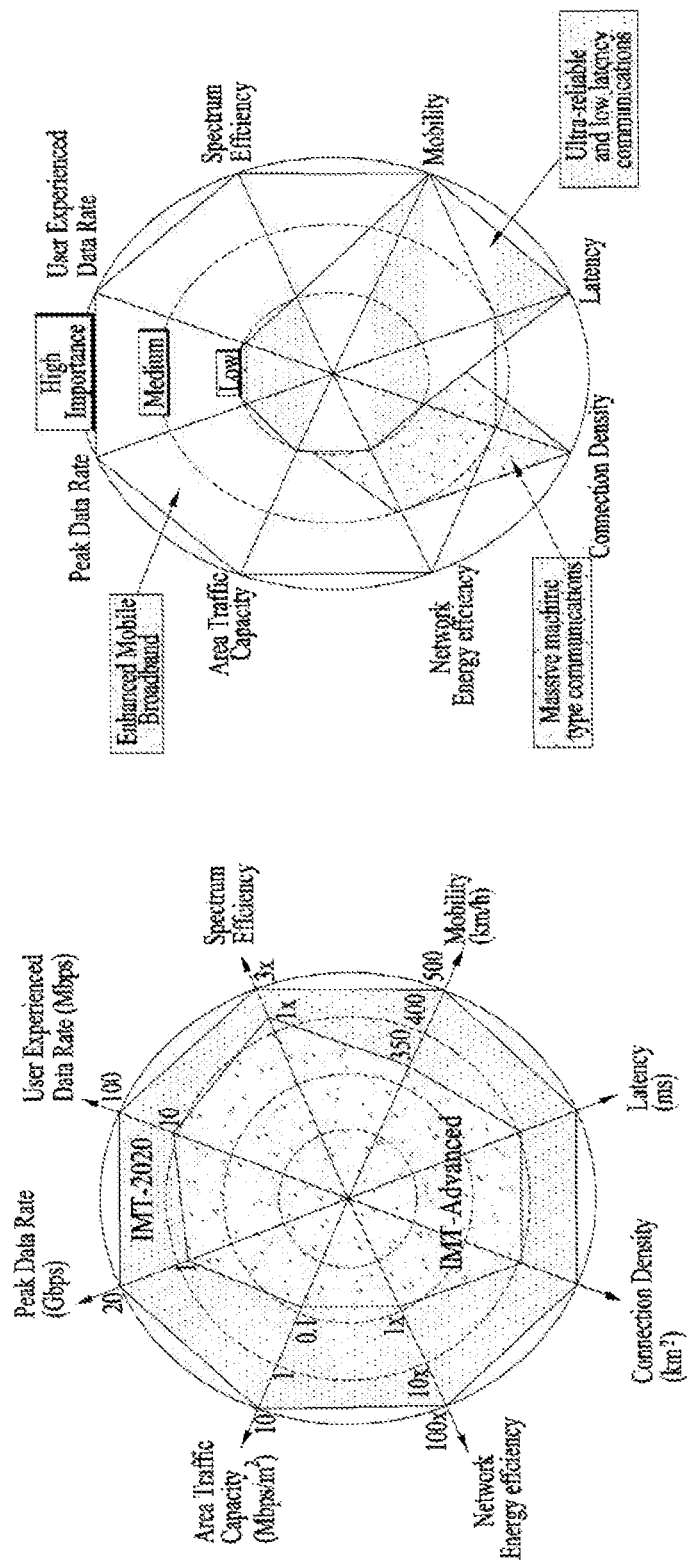
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 shows correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <10$^{-6}$)

Figure 3:
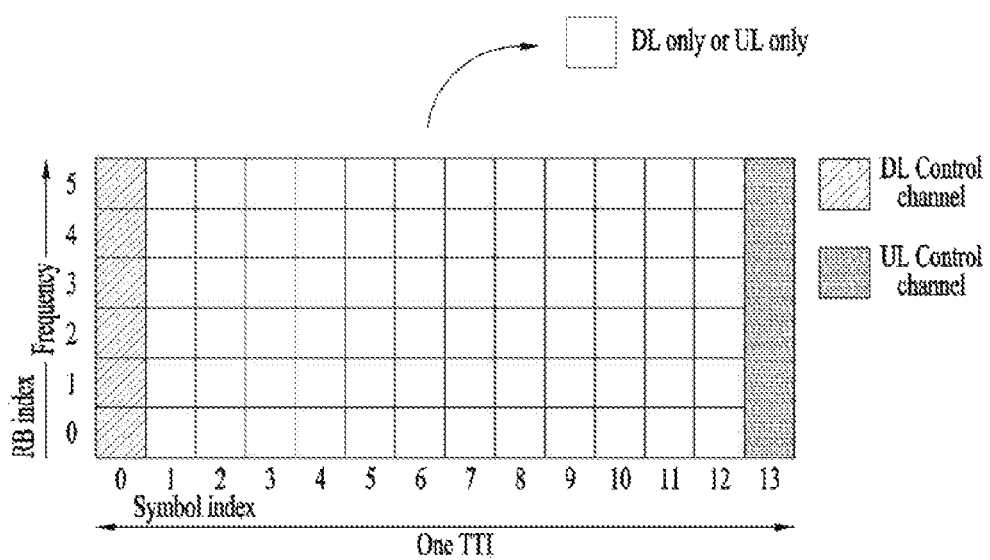
FIG. 3 is a diagram for an example of a subframe structure that TDM is performed on a data channel and a control channel.

FIG. 3 is a diagram for an example of a subframe structure that TDM scheme is applied between a data channel and a control channel.

FIG. 3 shows a subframe that a data channel and a control channel are TDM (time division multiplexed). Referring to FIG. 3, a slashed region corresponds to a downlink control region (i.e., a resource region in which a downlink control channel is transmitted) and a part represented by black color corresponds to an uplink control region (i.e., a resource region in which an uplink control channel is transmitted). In the subframe shown in FIG. 2, a region having no sign can be used not only for downlink data transmission but also for uplink data transmission. As a characteristic of the aforementioned structure, downlink (DL) transmission and uplink (UL) transmission are sequentially performed in a subframe. Hence, it may transmit DL data and receive UL ACK/NACK in a subframe. As a result, when a data transmission error occurs, it may be able to reduce time taken for retransmission and minimize latency of final data transmission.

In the subframe structure that the data channel and the control channel are TDM, in order for a base station and a UE to switch to a reception mode from a transmission mode or switch to the transmission mode from the reception mode, it is necessary to have a time gap. To this end, a partial OFDM (orthogonal frequency division multiplexing) symbol at the time of switching to UL from DL is set to a guard period (GP) in the subframe structure.

Discussion on a new waveform is in progress in the NR (new RAT) system to provide various services in a single carrier. In particular, it may be able to widen a data transmission bandwidth by enhancing a spectral containment characteristic in frequency domain or it may be necessary to have a waveform capable of improving performance in a synchronous reception situation. This can be achieved through filtering or windowing. On the contrary, in order to enhance the spectral containment characteristic in frequency domain, a length of a signal in time domain should be extended. Hence, it is necessary to design filtering or windowing in consideration of an impact of the time domain.

As mentioned above, the NR waveform needs the enhanced spectral property in order to achieve more efficient spectrum utilization which is one of important factors for NR waveform. In addition, a well time-localized waveform is essential for NR to support low latency communication with very short TTIs. Especially, the time localization of waveform is tightly coupled with UL/DL switching in TDD system. If DL/UL switching occurs frequently, this issue becomes more important.

FIG. 4 is a diagram for a conceptual symbol shape of waveforms in time domain.

FIG. 4 shows the conceptual symbol pulse shape of waveforms. Effective symbol length (w/ filtering or windowing) is defined as the total length of one OFDM symbol after filtering or windowing. Total length of effective symbol can be calculated as equation 1.

$$N_{eff} = N_{fft} + N_{cp} + (N_{fir} - 1) + N_{taper}.$$ [Equation 1]

Here, $N_{fft}$ means symbol duration excluding CP or ZP, $N_{cp}$ is CP length, $N_{fir}$ indicates filter length for filtering case, $N_{taper}$ represents tapered region for windowing case.

Impact on Guard Period in TDD System

With understanding of the effective symbol length, we investigate impact on guard period margin when DL to UL (UL to DL) switching occurs in TDD system. For simple explanation, we assume that guard period length is equal to one symbol length in the case of DL to UL switching and no guard period exists for the case of UL to DL. Also, it is assumed that timing advanced is applied. We focus on the RF switching time margin at the UE side.

Figure 5:
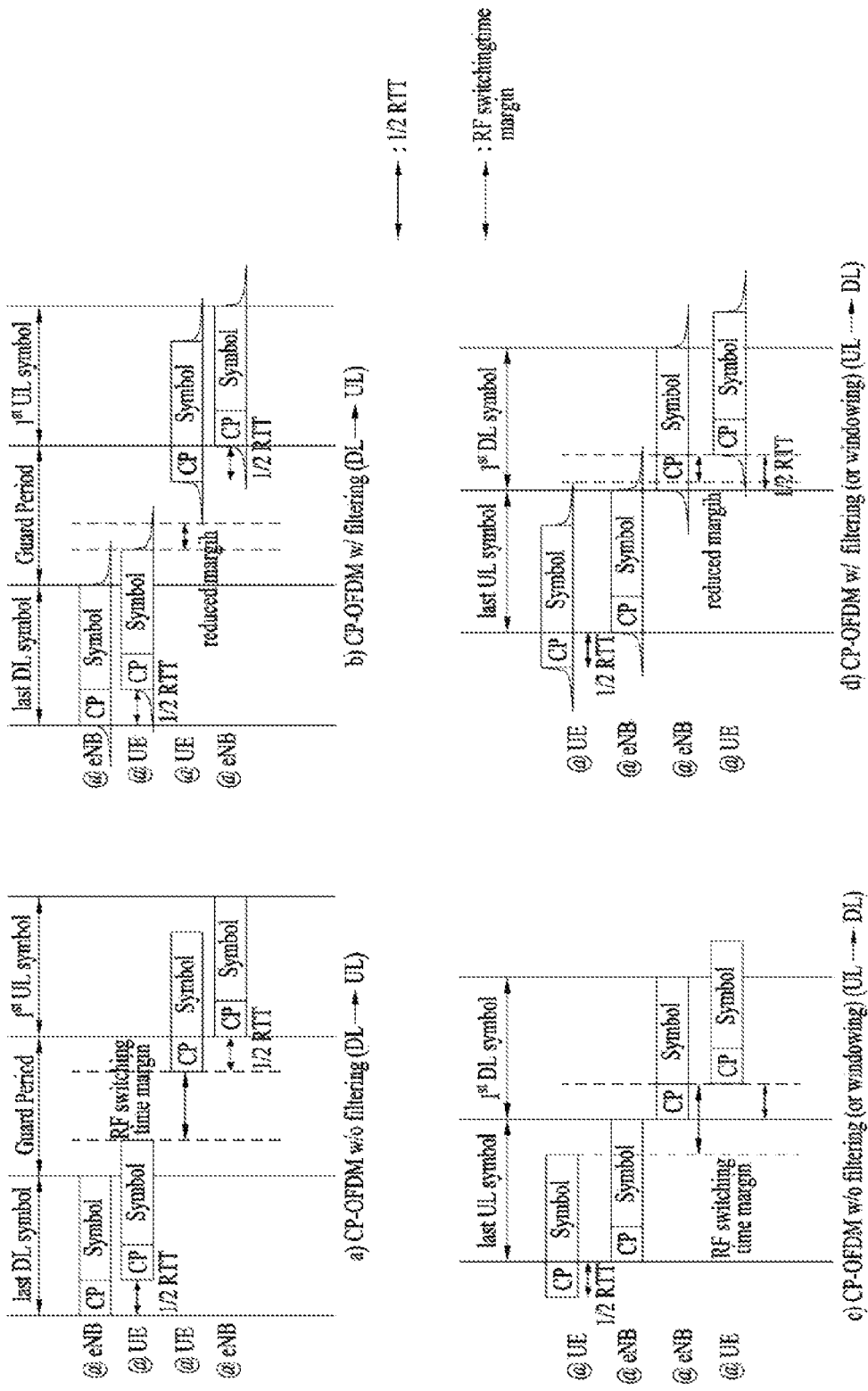
FIG. 5 is a diagram for examples of an RF switching margin in TDD.

FIG. 5 is a diagram for examples of an RF switching margin in TDD.

FIGS. 5a) and 5b) show RF switching time margin at the UE in case of DL to UL switching. We observe that FIG. 5b) shows the reduced margin time due to a part of filter head compared to FIG. 5a) where filtering is not considered. Similarly, for the case of UL to DL switching, it can be seen that the filter tail leads to the reduction of switching time. Therefore, it is necessary for waveform design to consider the time localization property as well as frequency localization under consideration of time and frequency duality.

Spectral shaping in a waveform can be performed through filtering or windowing. In the following description, although schemes are explained based on windowing, the schemes can be identically applied to a filtering scheme.

Figure 6:
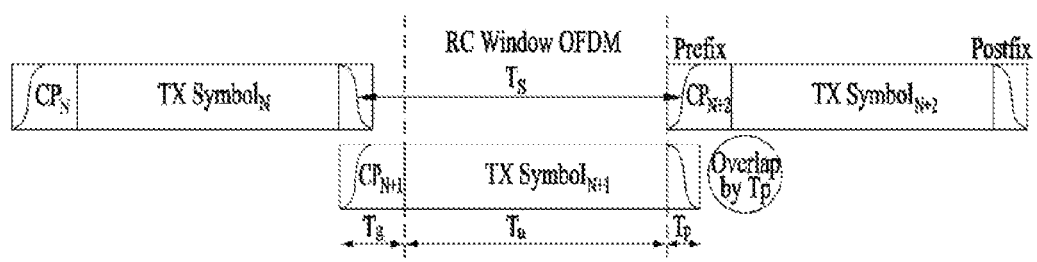
FIG. 6 is a diagram for an example of a waveform to which windowing is applied.

FIG. 6 is a diagram for an example of a waveform to which windowing is applied.

FIG. 6 shows a transmission signal to which windowing is applied. As shown in FIG. 6, if windowing is applied, distortion is added to a part of a CP (cyclic prefix) and the last part of a symbol. As a result, the distortion brings about actual attenuation of an effective CP. Hence, if a length of $T_p$ corresponding to a taper region is extended, although spectral containment becomes better, but inter-symbol interference (ISI) due to a channel tends to be worse.

Embodiment 1: Windowing/Filtering Selection Scheme Linked with Timing Advance (TA)

First of all, a transmitting end and a receiving end (eNB/UE) determine a receiving end FFT (Fast Fourier Transform) windowing based on overhead of windowing, i.e., taper length Tp, to maximize performance. And, in case of performing filtering, if information on a filter is known to the transmitting end and the receiving end (eNB/UE), it may be able to maximize SNR (signal to noise ration) by selecting a matched filter (conjugating time-reverse to a filter). Hence, information on windowing/filtering (e.g., taper length Tp in case of performing windowing, filter coefficient in case of performing filtering) between the transmitting end and the receiving end can be useful for enhancing performance.

And, as mentioned earlier in FIGS. 5a) and 5b), the windowing/filtering scheme is associated with a margin in relation to RF switching time. Hence, it is necessary to adaptively control the taper length Tp and the filter coefficient for system performance.

Embodiment 1-1

A UE determines a windowing type according to a timing advance value and may be then able to transmit UL using the determined windowing type.

Figure 7:
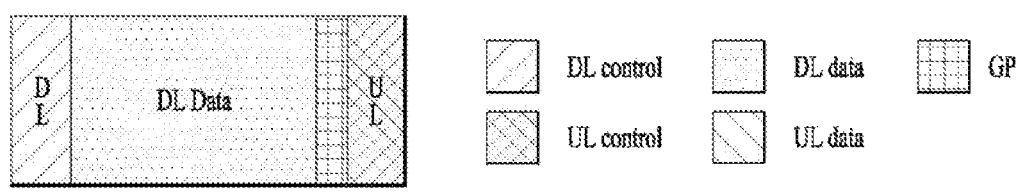
FIG. 7 is a diagram for a case of FIG. 6 when UL appearing after a GP is transmitted after DL is received in a self-contained subframe (frame) structure.

FIG. 7 is a diagram for a case of FIG. 6 when UL appearing after a GP is transmitted after DL is received in a self-contained subframe (frame) structure.

In this case, a windowing type corresponds to each windowing of which an effective symbol length is different when windowing is applied. In particular, as an example, the windowing type may correspond to a type distinguished from each other according to the effective symbol length when windowing is applied. As an example, if raised cosine windowing is assumed, a length of windowing varies according to an overhead value alpha. For example, it may consider 3 types of windowing length such as alpha=0.05, 0.1, and 0.15. As an example, Table 1 in the following shows a linkage between a TA and a windowing type between a base station and a UE.

TABLE 1

| TA range (samples) | Windowing type |
| --- | --- |
| 0~100 samples (or 0~2 us) | Windowing type 1 (e.g., Tp = 40 samples) |
| 101~200 samples (or 2~4 us) | Windowing type 2 (e.g., Tp = 20 samples) |
| 201~300 samples (or 4~6 us) | Windowing type 3 (e.g., Tp = 10 samples) |

Referring to Table 1, if a TA range (samples) corresponds to 0~100 sample (or 0~2 us), it may correspond to a windowing type 1 (e.g., Tp=40 samples), if a TA range (samples) corresponds to 101~200 sample (or 2~4 us), it may correspond to a windowing type 2 (e.g., Tp=20 samples), and if a TA range (samples) corresponds to 201~300 sample (or 4~6 us), it may correspond to a windowing type 3 (e.g., Tp=20 samples). In Table 1, a linkage between windowing types can be predefined. And, it may have a linkage map between TA of a plurality of sets and a windowing type. A base station can transmit information on the linkage map and a set index to a UE through system information (e.g., physical broadcast channel (PBCH), system information block (SIB), etc.), radio resource control (RRC) signaling, or a physical layer signal (e.g., physical downlink control channel, etc.).

As an example, when a UE transmits an RACH preamble (msg 1) to a base station and receives a random access response message (msg 2) from the base station, if TA information included in the random access response message corresponds to 300 samples, the UE uses a windowing type 1 to transmit UL information. The base station is able to implicitly know a windowing type to be used by the UE for UL transmission based on the TA transmitted by the base station and a mapping relation shown in Table 1. The base station detects a windowing type based on the aforementioned assumption.

As an example, a length of Tp can be reduced in a sample unit according to TA. For example, if it is assumed that a Tp value corresponds to 100 when the TA corresponds to 0, if the TA corresponds to 30, the Tp becomes 70. If the TA is greater than 100, the Tp value becomes 0. In particular, if a windowing scheme corresponds to a rectangular type, although ISI and an RF switching margin become maximum, spectral containment in frequency domain becomes worse.

Embodiment 1-2

If DL data to be received does not exist in a subframe and UL data exists in the subframe, a UE transmits the UL data by applying a windowing type corresponding to a smallest TA value. A base station is able to know whether or not a DL/UL resource for the UE is allocated to the subframe. And, the UE is able to know whether or not DL reception data exists in the subframe by decoding DCI information. Hence, if DL reception data does not exist in the subframe and UL transmission data exists in the subframe, the UE selects a windowing type corresponding to a smallest TA value and applies the selected windowing type to transmit UL data. For example, in Table 1, if a UE corresponds to a UE of which a TA value corresponds to 4 us, the UE transmits UL data using a windowing type 1 instead of a windowing type 2.

Embodiment 1-3

If the sum of three values (RF switching time value, timing advance value, and ½ RTT value) is greater than a guard period value, a UE applies a windowing type corresponding to a largest TA value in a linage map between TA and a windowing type to transmit UL data. And, it may be able to additionally include UE switching margin time. And, the UE may inform a base station that the UE switching margin time is additionally included.

As an example, assume that GP time corresponds to 10 us and RF switching time corresponds to 5 us. And, assume that a TA value corresponds to 3 us after RACH is transmitted. Hence, the sum of the RF switching time, the TA, and ½ RTT (round trip time) becomes 11 us and the sum becomes greater than the GP. Hence, the UE informs the eNB that the GP time is insufficient in advance. Subsequently, the UE does not use the windowing type 2 of which the TA value is 3 us in Table 1. Instead, the UE uses a windowing type 3 corresponding to a windowing type of which the TA value is greatest. The UE can deliver the indication indicating the insufficient GP time to the base station through a physical layer signal (e.g., uplink control information (UCI) of a physical control channel) or an upper layer signal (RRC signaling), etc.

In the embodiment 1-3, having received the indication indicating that the sum of the RF switching time, the TA value, and the ½ RTT is greater than the guard period value, the base station punctures the last symbol of a DL data part and transmits the punctured last symbol to the UE. In this case, the UE adds puncturing time to the GP to newly calculate the TA and may be then able to select a windowing type again based on the calculated TA value. The base station can inform the UE of an indication indicating that the last symbol of the DL data part is punctured and the punctured last symbol is transmitted to the UE in a subframe in which the DL data is transmitted through downlink control information or the like.

If a PUCCH symbol is configured by two symbols, a PUCCH symbol position can be determined according to a TA value. As an example, if TA is equal to or greater than a predetermined threshold, a UE transmits PUCCH using a second symbol. In this case, the UE newly calculates the TA by adding symbol time of which GP and PUCCH are added to the TA. The UE can select a windowing type again based on the calculated TA value. The base station can recognize a position of PUCCH according to the TA value.

Embodiment 2: Method of Selecting Windowing/Filtering Linked with UE Capability

RF switching time may vary depending on implementation of a UE. Hence, when the UE performs initial access, the UE may inform a base station of an available windowing type in advance based on currently configured GP time, RF switching time, and implementation margin. Based on the windowing type, the base station and the UE may have UE capability specific mapping.

As an example, as shown in Table 2 and Table 3, it may consider a different linkage table according to UE capability.

TABLE 2

| TA range (samples) | Windowing type |
| --- | --- |
| 0~100 samples (or 0~2 us) | Windowing type 1 (e.g., Tp = 40 samples) |
| 101~200 samples (or 2~4 us) | Windowing type 2 (e.g., Tp = 20 samples) |
| 201~300 samples (or 4~6 us) | Windowing type 3 (e.g., Tp = 10 samples) |

TABLE 3

| TA range (samples) | Windowing type |
| --- | --- |
| 0~150 samples (or 0~3 us) | Windowing type 2 (e.g., Tp = 20 samples) |
| 151~300 samples (or 3~6 us) | Windowing type 3 (e.g., Tp = 10 samples) |

Table 2 and Table 3 respectively show an example of linkage used by a UE having different implementation capability.

For example, in case of a high capability UE that RF switching time is short, the UE can use a window type 1 of a longest Tp to a window type 3 according to UE capability 1. On the contrary, the UE may use a window type 2 to the window type 3 only according to UE capability 2 depending on capability. The UE capability can be calculated again according to GP time.

And, it may also select a linked windowing/filtering according to a service type (e.g., URLLC/mMTC/eMBB service) provided to a UE by a base station. In particular, a corresponding windowing/filtering may exist with regard to each of the URLLC/mMTC/eMBB service.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a signal by adaptively controlling windowing or filtering by a user equipment in a wireless communication system, the method comprising:

receiving a message containing a timing advance (TA) value from a base station;

determining a windowing type or a filtering type corresponding to the TA value; and transmitting an uplink signal to which the determined windowing type is applied, wherein the windowing type is distinguished according to a length of a valid symbol and wherein the filtering type is distinguished according to a filter coefficient value.

2. The method of claim 1, wherein the TA value and the windowing type corresponding to the TA value are predefined.

3. The method of claim 1, further comprising the step of receiving information on the TA value and the windowing type corresponding to the TA value from the base station.

4. The method of claim 1, wherein if there is no downlink data to be received in a specific subframe and there is uplink data to be transmitted in the specific subframe, the determining comprises determining a windowing type corresponding to a predefined smallest TA value regardless of the received TA value.

5. The method of claim 4, wherein the transmitting comprises transmitting the uplink signal to which the windowing type corresponding to the predefined smallest TA value is applied in the specific subframe.

6. The method of claim 1, wherein if a sum of an RF switching time value of the user equipment, the TA value and ½ RTT value is greater than a guard period (GP) value, the determining comprises determining a windowing type corresponding to a predefined largest TA value regardless of the received TA value.

7. The method of claim 6, wherein the transmitting comprises transmitting the uplink signal to which the windowing type corresponding to the predefined largest TA value is applied.

8. The method of claim 1, further comprising transmitting a random access preamble to the base station, wherein the message is received in response to the random access preamble.

9. The method of claim 1, wherein the transmitting comprises transmitting an uplink signal to which a taper length corresponding to the determined windowing type is applied.

10. A user equipment for adaptively controlling windowing or filtering in a wireless communication system, the user equipment comprising:
a receiver configured to receive a message containing a timing advance (TA) value from a base station;
a processor configured to determine a windowing type or a filtering type corresponding to the TA value; and
a transmitter configured to transmit an uplink signal to which the determined windowing type is applied,
wherein the windowing type is distinguished according to a length of a valid symbol and wherein the filtering type is distinguished according to a filter coefficient value.

11. The user equipment of claim 10, wherein the TA value and the windowing type corresponding to the TA value are predefined.

12. The user equipment of claim 10, further comprising the step of receiving information on the TA value and the windowing type corresponding to the TA value from the base station.

13. The user equipment of claim 10, wherein if there is no downlink data to be received in a specific subframe and there is uplink data to be transmitted in the specific subframe, the processor is configured to determine a windowing type corresponding to a predefined smallest TA value regardless of the received TA value.

14. The user equipment of claim 13, wherein the transmitter is configured to transmit the uplink signal to which the windowing type corresponding to the predefined smallest TA value is applied in the specific subframe.

15. The user equipment of claim 10, wherein if a sum of an RF switching time value of the user equipment, the TA value, and ½ RTT value is greater than a GP (guard period) value, the processor is configured to determine a windowing type corresponding to a predefined largest TA value irrespective of the received TA value.

16. The user equipment of claim 15, wherein the transmitter is configured to transmit the uplink signal to which the windowing type corresponding to the predefined largest TA value is applied.

17. The user equipment of claim 10, wherein the transmitter is configured to transmit a random access preamble to the base station and wherein the receiver is configured to receive the message in response to the random access preamble.

18. The user equipment of claim 10, wherein the transmitter is configured to transmit an uplink signal to which a taper length corresponding to the determined windowing type is applied.

* * * * *